United States Patent Office 3,033,647
Patented May 8, 1962

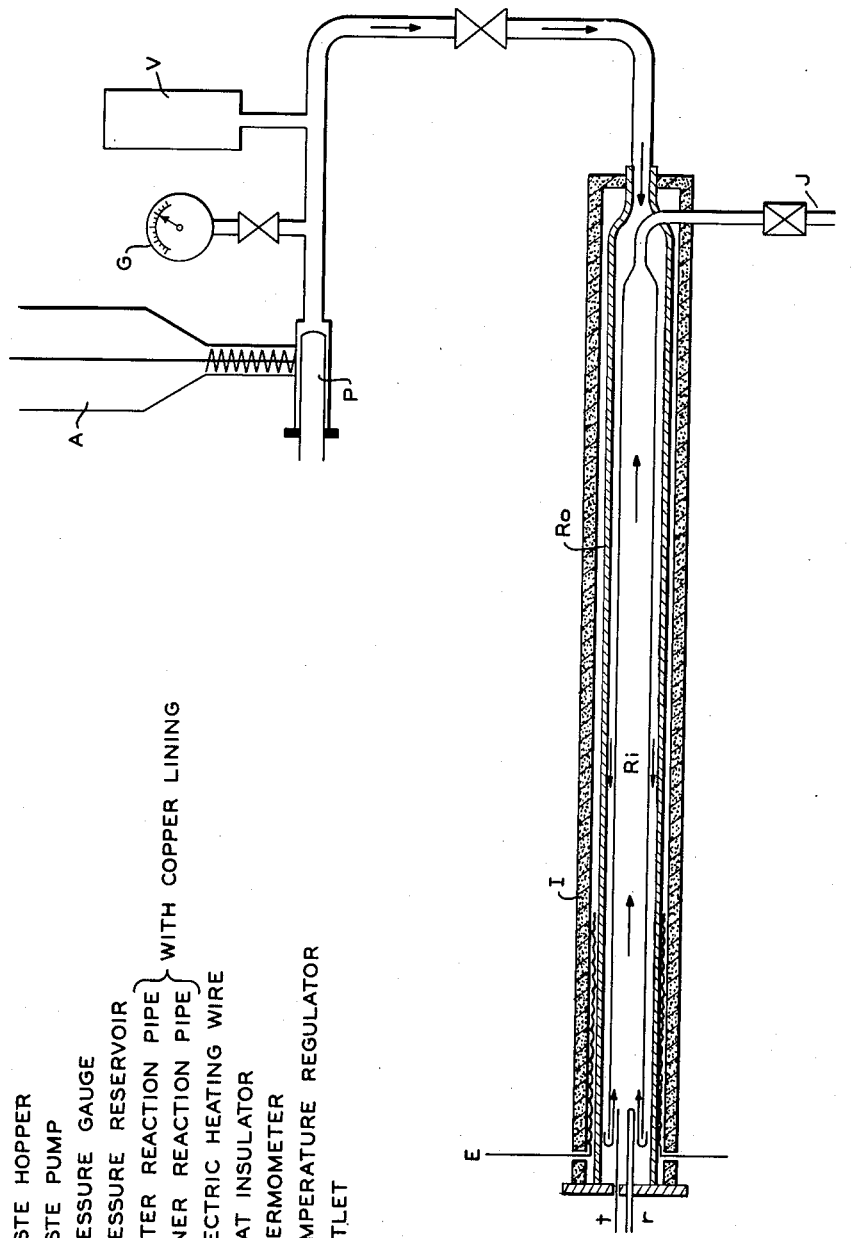

3,033,647
METHOD OF EXTRACTING ALKALI METALS FROM ORES BY HYDROTHERMAL TREATING AT ABOUT THE CRITICAL TEMPERATURE
Jumei Yamazaki, 56 Tsukiyashiki, Kochi City, Japan
Filed Dec. 29, 1954, Ser. No. 478,467
7 Claims. (Cl. 23—33)

This invention relates to the process of both decomposing insoluble minerals containing Li, Na, K, Rb, Cs, etc. such as spodumene, $Li_2O Al_2O_3 4SiO$, lithia-mica $KLi[Al(OH.F)_2]Al(SiO_3)_3$, amblygonite $LiFAlPO_4$, petalite $Li_2O Al_2O_3 8SiO_2$, feldspar, $KAlSi_3O_8$, liparite . . . etc. and perfectly extracting LiOH, KOH, . . . by one operation, a hydrothermal reaction between these minerals and barium hydroxide or lime.

Its characteristic is that it enables one to treat a large quantity of ore by the continuous passing of raw materials through a pipe-type pressure vessel with a paste pump, which is made possible by instantaneous reaction effected by the circumstances of the critical region of aqueous solution with or without the addition of OH ions.

This process is suitable for treating quickly a large quantity of ores containing not only a large, but also a small, amount of lithium, and makes it possible economically to extract lithium and other alkalis from the ores by a comparatively small plant.

Methods heretofore in use:

No. 1: Powder of potassium feldspar or potassium liparite mixed with a proper quantity of quicklime, slaked lime or carbide slurry is stirred, while heated in an autoclave, so that the contained potassium may be dissolved as KOH. If the temperature is in the vicinity of 250° C. (pressure 39 atm.), about 95 percent will be dissolved in 3 to 4 hours. The desirable working conditions are low temperature and low pressure. But this will also lower the dissolution percentage.

No. 2: Lime is made to react on lithia-mica and other lithium ores in an autoclave as in No. 1, so that LiOH is dissolved. It is said that a treating of three hours at the temperature of 170° (atm. 7.5) will get the dissolution to a degree of about 98 percent effectiveness.

In the autoclave treating of the above mentioned methods, especially when a large quantity is treated, low temperature and low pressure are to be desired. In considering the relation between the wall thickness of an autoclave and the maximum bearable pressure, the ratio of the inner to the outer diameter is an important factor. Consequently an autoclave of large inner volume with high pressure to bear must have a very thick wall, which makes the construction of the plant difficult and its operation inconvenient, thus hindering a large scale treatment in various ways. In any of these methods the need of low temperature and low pressure makes the treatment a matter of several hours.

The method of my invention, which is the opposite to the above-mentioned, makes possible the simple and economical treatment of a large quantity in a small plant easy to install, by using a pipe-typed autocalve of small diameter. In using a pipe-typed autoclave, if a large quantity is to be treated in a short time, the reaction time must be reduced to the minimum. To put it inversely, if the reaction time is reduced to a minute or so, one will be able to obtain, by continuous passing of raw materials, a form of treating a large quantity in an autoclave of small diameter even under high temperature and pressure. For this purpose I utilize my following data.

*Datum 1.*—In the reaction of hydroxides of alkali earths upon ores the reaction rate reaches its maximum in the vicinity of the critical state of the solution. Especially in the case of feldspar, liparite, lithia-mica, etc., if you use $Ba(OH)_2$ or promote the action of lime by using $Ca(OH)_2$ of good quality or by the increase of the concentration of OH— ions, you can make the reaction almost instantaneous in the critical region.

Consequently if this condition is secured, one can accomplish the purpose simply by making the paste pass through the autoclave at about critical temperature. In a state above the critical temperature, the liquid phase disappears, causing marked rising in pressure, and producing various troubles in operation. The conclusion is that the atmosphere in and near the critical state has a special effect. As is well known, a substance does not make a sudden transition at the critical temperature, but the transition is continuous, its various properties changing continuously in the vicinity. The optium for reaction exists in this region.

*Datum 2.*—$Ba(OH)_2$ has a most extraordinary decomposing action on ores, and instantaneously decomposes all the above-mentioned minerals in the critical region. $Ca(OH)_2$ is markedly weak compared with NaOH or KOH and promotes the action of lime, which results in still further reduction of the reaction time. The promotion effect is roughly in proportion to the concentration of the OH— ions. In this case the quantity of lime required for the perfect decomposition of the minerals will be much less than in the case of the reaction unaided by OH— ions.

*Datum 3.*—The reactivity of lime varies a great deal according to its quality. The promoting effect of the addition of OH— ions is conspicuous generally, but especially for slaked lime of low reactivity. When, for instance, the velocity of unaided reaction is not sufficient even at the critical region, the addition of a small quantity of NaOH can make the reaction very speedy.

The above effects are combined in such a way that the peculiar effect of the critical state promoted by OH— ions makes possible the maximum reduction of the required reaction time, which in its turn makes possible simple and economical large-scale production by the continuous operation of a pipe-typed autoclave. The treatment under such conditions; namely—374° C., and above 217 atmosphere—is suited to an autoclave of small diameter, but is impracticable with a common tank-typed autoclave of large diameter.

Now I will give an example of the effect of the atmosphere in the critical region upon the reaction velocity. If powder of potassium feldspar, 300–325 mesh, is acted on in hot water of 300° C. by lime of comparatively high reactivity made by slaking quick lime by steam of normal temperature, a 100 percent reaction will need 35 to 40 minutes after the sample is heated to 300° C. and 3 or 4 hours in the case of 250° C. But at 360° C. the required time is only about 5 minutes. And if one used 1 N. NaOH solution instead of water, the reaction will be accomplished as soon as water and raw materials are heated to 360° C.

If $Ba(OH)_2$ is reacted with lithia-mica in the critical region you get complete decomposition and thorough dissolution of $Li_2O$ results almost instantaneously. The unaided action of highly reactive $Ca(OH)_2$ precipitated from the solution obtained by mixing NaOH and $CaCl_2$, and the combined action of ordinary slaked lime and 1 N. NaOH, although pretty quick, are inferior to $Ba(OH)_2$. Amblygonite and spodumene are decomposed almost instantaneously by $Ba(OH)_2$, and the contained lithium fluoride is dissolved thoroughly, in the critical region. But they cannot be completely decomposed in a short time even by slaked lime and 1 N. NaOH combined.

If the particle size of the ores is reduced from 44 (325 mesh) to a few microns, not only lithia-mica but also amblygonite and spodumene will instantaneously be decomposed completely in the critical temperature region by lime with an addition of NaOH.

Since $Ba(OH)_2$ is dissolved in hot water peculiarly well, paste obtained from its combination with ores has pretty higher critical temperature than that of the combination of $Ca(OH)_2$, dilute NaOH and ores. This paste, with its high concentration of $OH^-$ ions and high critical temperature is able to cause specially powerful decomposition.

As for the quantity of water to be mixed, the critical quantity, that is, the quantity necessary to bring about the critical pressure is the lower limit. As there is no free space (spaced occupied by steam) in the reaction pipe, the quantity necessary to make the matter or sample pasty is enough. The quantity, however, varies more or less according to the operating condition.

As for particle size, generally speaking, the smaller the better. For spodumene, amblygonite and lithia-mica you will sometimes find that $Ca(OH)_2$ mixed with NaOH does not achieve complete decomposition so easily, when the size of the ores is several tens of microns. If the size, however, is reduced to a few microns, the ores will get decomposed completely. For petalite you will have complete decomposition by lime with NaOH, even in case of the bigger particle size.

As for pressure, if there is formed any vapor phase in the reaction vessel, saturated vapor pressure becomes its limit. In my method, because there is no vapor phase in the reaction vessel, the operation is carried on under higher pressure than saturation vapor pressure by the manipulation of a paste pump and outlet device. Paste pressed above the critical pressure at the critical temperature has still greater reaction velocity as well as it is easier to operate. This is an important characteristic of this method which has a new effect not to be expected from the autoclave hitherto in use. If you make pressure extraordinarily high you will be able to treat at higher than the critical temperature. But in this case marked increase of necessary pressure causes inconvenience. Thus we know the region of the critical temperature is a peculiarly suitable condition of the reaction.

It follows from the preceding facts that in continuous operation it is desirable in order to make the paste flow smoothly that the solid particles should be as small and the paste viscosity, the product being sometimes colloidal micropowder, about 0.1 micron, sometimes in fine needle shape. From the above, it is apparent that conditions must be chosen which are suitable for the purpose. If a theoretical quantity of lime is used for making Ca-silicate, the main product, take its metaform $CaSiO_3$, and make the concentration of NaOH about 1 normal, there are obtained fine particles of $CaSiO_3$ and there will not be much trouble with the operation.

Explanation of the accompanying drawing:

The accompanying figure shows an example of the equipment with electric heating. The mixed paste comes in at the paste hopper A, and going through the paste pump P, is pressed into the outer reaction pipe Ro. At the end of the pipe the paste enters the inner pipe Ri and going through, is discharged at the outlet J. The pipes are heated electrically in their left part, heat exchange taking place in the right, between the paste in the pipes. All the walls of the reaction pipes facing the paste are covered with copper. The pressure reservoir V is provided for mitigating sudden change of pressure.

The advantages of this kind of plant for hydrothermal treatment are as follows:

(1) As there is no free space of gas phase in the pressure vessel, higher pressure than saturation vapor pressure is applied, and the uniform flow of the paste makes operation easy, and higher reaction rates are expected.

(2) Heat exchange is possible, which is unthinkable in intermittent operation.

(3) Stationary temperature and pressure make operation smooth and economical.

(4) Mass production is possible by a comparatively small plant.

The following are some examples of practice.

*Example 1.*—You mix finely powdered amblygonite, $Ba(OH)_2 \cdot 8H_2O$ and water (the ratio by weight being 1:6.5:2 and knead them into paste, while heating it, and press them into a reaction pipe, a half-way part of which is heated to about 370° C., at one end and press it out at the other continuously. The passing time through the heated part needed for the complete dissolution of lithium is only a minute or so.

*Example 2.*—You mix finely powdered spodumene or lithia-mica, $Ba(OH)_2 8H_2O$ and water, the ratio by weight being 1:6–5:2, and knead them into paste, while heating it, and press them into a reaction pipe, a half-way part of which is heated at about 370° C., at one end and press it out at the other continuously. The passing time through the heated part needed for the complete dissolution of lithium is only a minute or so.

*Example 3.*—You mix fine powder (several microns in diameter) of lithia-mica or spodumene or amblygonite and quicklime or slaked lime well with 2 N. NaOH solution the ratio being 1:1:(or 1.5):2 and treat the resultant paste as in Examples 1 and 2. The treating temperature is about 375° C. Several minutes are sufficient as the treating time in order to secure more than 95 percent as reaction degree.

*Example 4.*—You mix petalite powder and quicklime or slaked lime with 1 normal NaOH solution the ratio 1:1.2(or 1.7):1.6 and make the paste pass through a reaction vessel, a part of which is kept at almost its critical temperature of water, as in the preceding examples. The treating time in the critical region necessary for getting reaction degree 95 percent will be several minutes.

*Example 5.*—You mix finely powdered potassium feldspar or liparite and quicklime or slaked lime with water ratio 1(or 1.2):1.5(or 2:2.5) and treat the resultant paste as in the above examples. The treating temperature is about the critical temperature of water 375° C. The velocity of the paste in passing through the pipes required for complete reaction depends very much upon the quality of the slaked lime. If you use slaked lime of comparatively great activity such as obtained by roasting limestone $CaCO_3$ at suitable temperature and slaking it slowly by steam at room temperature, the treating time at the critical temperature will be minutes.

*Example 6.*—You mix fine powder of potassium liparite and quicklime or slaked lime uniformly into paste with 0.5 N. NaOH the ratio being 1:1.2(or 1.6):2 and treat it as in the above examples. The temperature of the reaction pipe is kept at 370° C. The treating time needed for getting more than 95 percent reaction degree is reduced to a few minutes.

The above are only a few of the examples. The higher concentration of used $OH^-$ ions and the smaller size of ore material leads to the greater reduction of the treating time and the greater effect upon lime of low reactivity. But the concentration must be selected considering the variety of ores, the characteristics of used lime, and other conditions. If you use highly powdered ores and make the promoting effect great enough by high concentration of $OH^-$ ions the desired practice in accordance with my invention is possible even in the lower region of the critical state with a little lower temperature. You can use instead of NaOH any substance which can provide $OH^-$ ions more abundantly than slaked lime, such as KOH, LiOH or $Ba(OH)_2$. You can use MgO, $Mg(OH)_2$ instead of lime for the same purpose. Because $Ba(OH)_2$ has by itself a most eminent decomposing power by its high solubility in hot water and the excess $Ba^{++}$ ions in the extract can be easily eliminated by the passing of $CO_2$, no trouble occurs in separating lithium from the solution as in the case of $Na^+$ ions. Therefore $Ba(OH)_2$ is more effective and desirable than the combination of Ca(OH)$_2$ and NaOH in the decomposition of lithium ores.

Since the alkalies dissolved in the discharge are all hydroxides, if you can utilize a part of the extracted solution for mixing with the raw material, it will be still more economical.

The product discharged out of the reaction pipes, if dried as it is, will make potassium fertilizer containing soluble silicate. If extracted by water and combined with various acid radicals, it will make various potassium salts. In case you treat lithia-mica and other lithium ores, you can separate CaCO$_3$ by passing of CO$_2$ into the extracted solution and produce from the residue salts of lithium, potassium, rubidium, caesium and so on by the well known processes.

As for the quantity of lime to be mixed with ores, the addition of NaOH or the like will decrease it greatly. The explanation is as follows. In my examinations, if NaOH is added, the decomposition of the minerals goes on by the formation of products containing a smaller quantity of calcium such as metacalcium silicate CaSiO$_3$ and metacalcium aluminate CaAl$_2$O$_4$, while the quantity needed for the formation of orthocalcium silicate CaSiO$_4$ and orthocalcium aluminate Ca$_3$Al$_2$O$_6$ is necessary in the case of unaided action of lime. Generally speaking half the quantity of the latter case is sufficient for SiO$_2$ content of ores. For this reason the addition of NaOH is always advantageous in practice.

While various examples of the invention have been disclosed it is to be understood that changes as to steps, procedure and use of materials may be made without departing from the spirit and scope of the invention as claimed.

I claim:

1. In the method of recovering alkali metal values from their ores, the improvement comprising exerting pressure above the saturation vapor pressure on a slurry of the ore matter made by mixing ores containing alkali elements selected from the group consisting of spodumene, lithia mica, amblygonite, petalite, feldspar and liparite, with water and a substance selected from the group consisting of an alkaline earth oxide and an alkaline earth hydroxide and passing the mixture into a high pressure reaction area at one end thereof, a half way part of which area is always heated at about the critical temperature of the aqueous medium and pressing said part out at the other end of the area in decomposing the above mentioned ores and dissolving the alkalies hydrothermally.

2. The method, described in claim 1, of making Ba(OH)$_2$ act upon amblygonite, wherein Ba(OH)$_2$ is the substance mixed with the ores and water.

3. The method, described in claim 1, wherein there is effected a heat exchange by having the first and the second halves of the flow in opposite directions as paste passes through the reaction media.

4. The method of obtaining alkali metal elements from their insoluble ores above the saturation vapor pressure of the ore comprising mixing at least one ore selected from the group consisting of spodumene, lithia-mica, amblygonite, petalite, feldspar and liparite, with an OH ion supplying substance selected from the group consisting of an alkaline earth oxide and alkaline earth hydroxide and water to form a paste, then continuously feeding a supply of said paste into a confined continuous restricted area while heating the paste at the critical temperature of the water and forcing the paste out of the other end of the restricted area thereby hydrothermally decomposing the minerals and OH ion containing substances.

5. The method according to claim 4 wherein the range of the critical temperature used on the paste is between 370° C. and 380° C.

6. A process of leaching, by an autoclave, alkali metal ions from their insoluble ores such as spodumene, lithia-mica, amblygonite, petalite, feldspar, liparite and the like comprising decomposing said ores and simultaneously dissolving lithium, potassium, rubidium, cesium contained in them, by making a slurry like mixture which consists of said ores and oxides and hydroxides of alkaline-earth metals, selected from the group consisting of barium oxide, calcium oxide, barium hydroxide, and calcium hydroxide, added with alkaline water containing increased OH$^-$ ions, passing the mixture through a high pressure reaction area under a pressure above the saturation vapor pressure of the slurry, while heating it at about the critical temperature of the aqueous medium liquid on its way through said area.

7. In the process of recovering alkali metal values from at least one of their insoluble ores selected from the group consisting of spodumene, lithia mica, amblygonite, petalite, feldspar, and liparite, the steps comprising dissolving the respective metal values from said ores at a critical temperature of about 370° C. under a pressure exceeding 200 kg./cm.$^2$ by making a slurry-like mixture of said ores, water and at least one member selected from the group consisting of hydroxides of alkaline earth metals and hydroxides of alkali metals, passing the mixture through a high pressure area under a pressure above the saturation vapor pressure of the slurry while heating it to about the critical temperature of the aqueous medium liquid on its passage through said area.

References Cited in the file of this patent

UNITED STATES PATENTS

| | | |
|---|---|---|
| 2,021,987 | Colton | Nov. 26, 1935 |
| 2,413,644 | Nicholson | Dec. 31, 1946 |
| 2,662,809 | Kroll | Dec. 15, 1953 |